United States Patent [19]

Egner

[11] 3,967,669

[45] July 6, 1976

[54] CLINCH TYPE FASTENER

[75] Inventor: Ronald J. Egner, Birmingham, Mich.

[73] Assignee: Textron, Inc., Providence, R.I.

[22] Filed: Oct. 29, 1974

[21] Appl. No.: 518,522

Related U.S. Application Data

[63] Continuation-in-part of Ser. No. 467,213, May 6, 1974, abandoned.

[52] U.S. Cl............................. 151/41.73; 29/520; 151/41.72
[51] Int. Cl.² ........................................ F16B 39/282
[58] Field of Search................ 151/41.73, 41.72, 37; 29/432, 520; 52/758 F, 758 D; 85/19

[56] References Cited
UNITED STATES PATENTS

| | | | |
|---|---|---|---|
| 1,112,525 | 10/1914 | Darling ......................... | 151/41.73 X |
| 1,686,468 | 10/1928 | Rosenberg ..................... | 85/19 |
| 3,137,336 | 6/1964 | Wing............................. | 151/41.73 |
| 3,221,791 | 12/1965 | Rosan ........................... | 151/41.73 |
| 3,242,962 | 3/1966 | Dupree ......................... | 151/41.73 |
| 3,367,685 | 2/1968 | Church et al.................. | 151/41.72 X |
| 3,399,705 | 9/1968 | Breed et al. ................... | 151/41.73 |
| 3,461,936 | 8/1969 | Rosan et al. .................. | 151/41.73 X |
| 3,535,678 | 10/1970 | Gulistan........................ | 151/41.72 X |
| 3,578,367 | 5/1971 | Harvill ......................... | 151/41.73 X |
| 3,782,436 | 1/1974 | Steiner.......................... | 151/41.73 |

FOREIGN PATENTS OR APPLICATIONS 370,948 4/1932 United Kingdom.............. 151/41.72

*Primary Examiner*—Ramon S. Britts
*Attorney, Agent, or Firm*—Olson, Trexler, Wolters, Bushnell & Fosse, Ltd.

[57] ABSTRACT

A self-clinching fastener and method of engagement thereof with an aperture section of sheeted material. The fastener includes a shank portion and an enlarged head, said shank portion having a tapered extruding section thereon of larger diameter than the aperture in said sheet material. The initial assembly steps resulting in said extruding section engaging and deforming a portion of the sheet material about said aperture to resize said aperture to a predetermined diameter, such that said shank will now be closely engaged with the aperture walls, and if desired the effective length of said aperture may be increased by the production of a rimmed hole. Accordingly, upon the further embedding of the fastener head into said sheet material, a portion of said material will be displaced radially inwardly to fill a relatively wide annular groove formed in said fastener shank thereby assuring a firm mechanical interlock. In addition, the fastener head may include a plurality of radially disposed projections which, when embedded in the sheet material, preclude relative rotation; and advantageously, the aforesaid radial projection may be provided with outwardly and downwardly tapering undersurfaces which tend to force displaced material radially inwardly and thereby assure complete filling of the locking groove.

13 Claims, 15 Drawing Figures

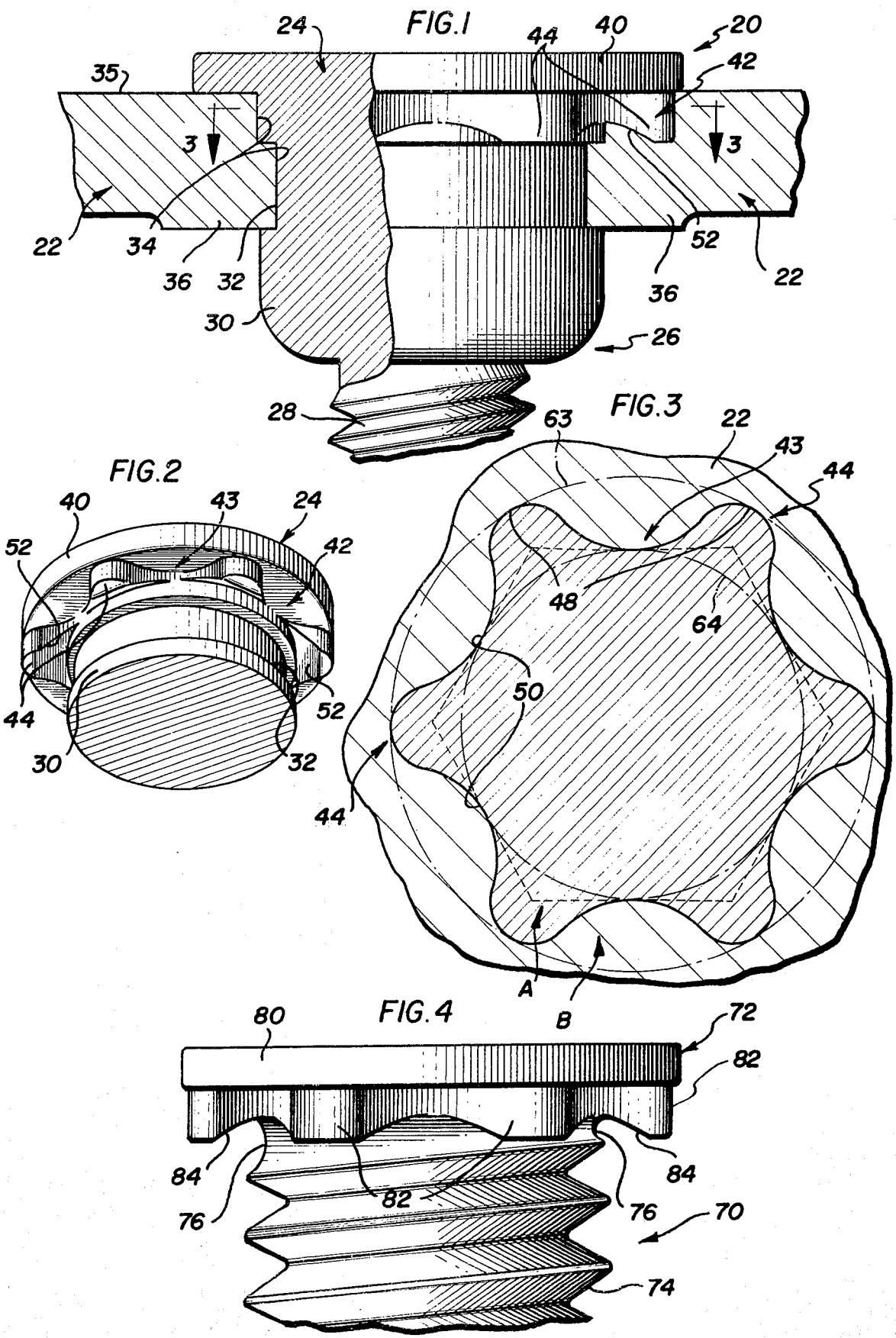

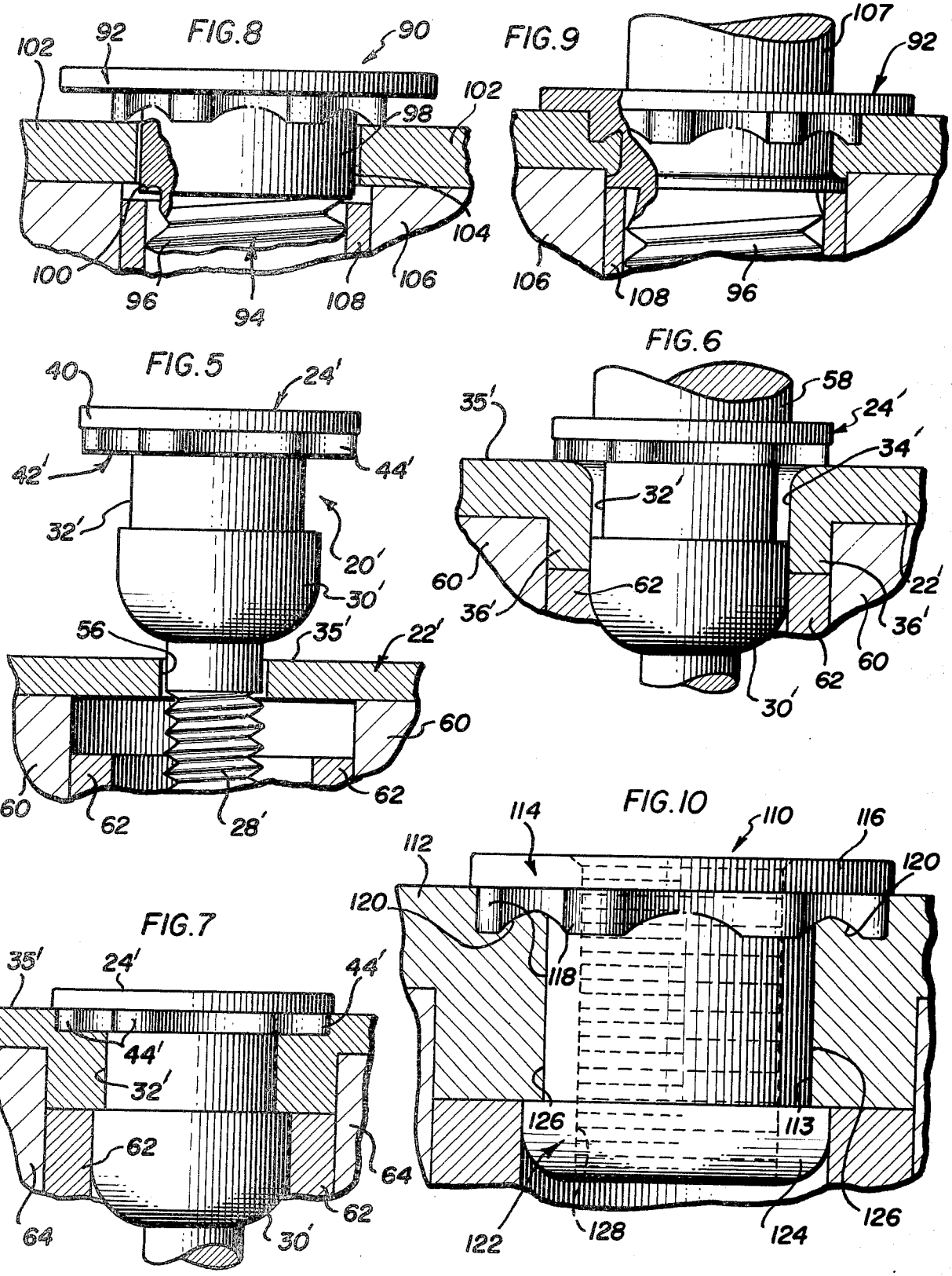

FIG.11
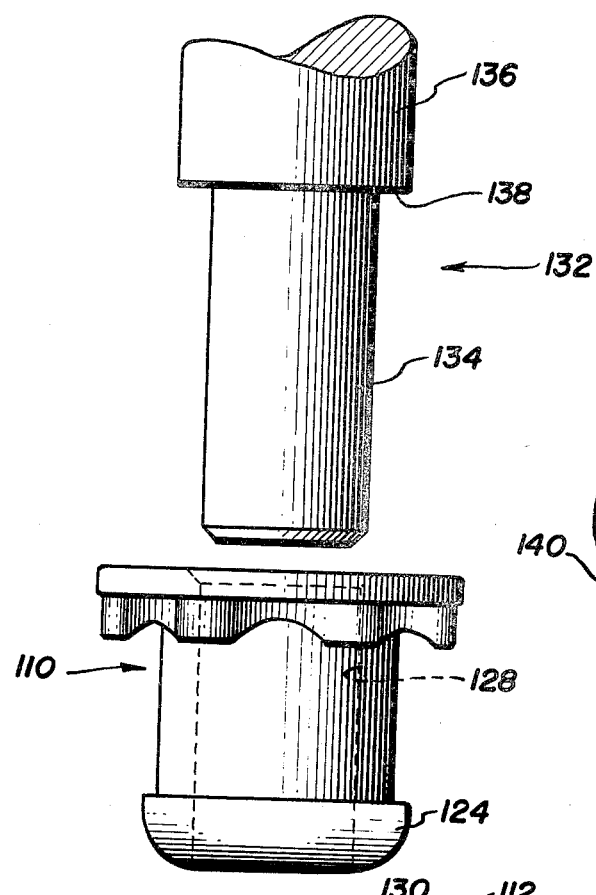
FIG.12
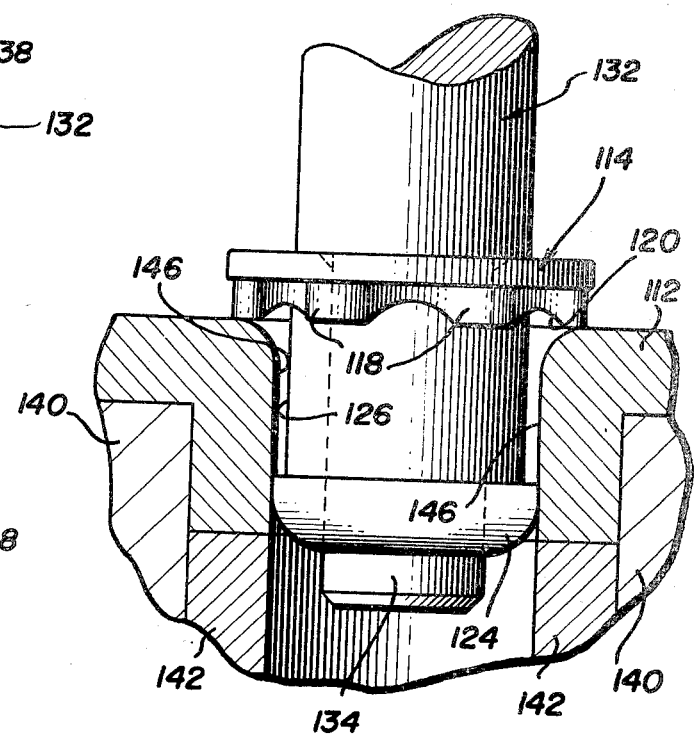
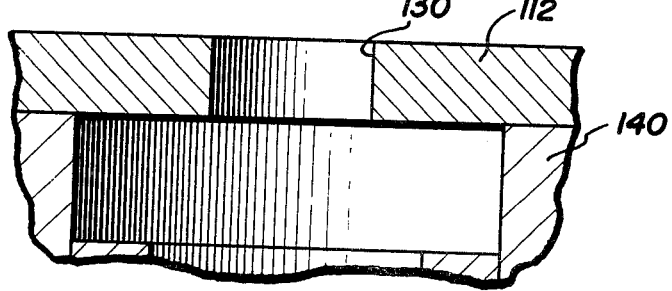
FIG.13
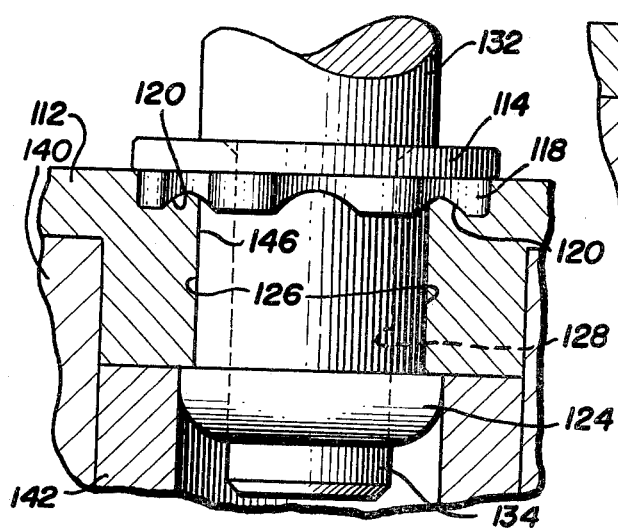
FIG.14
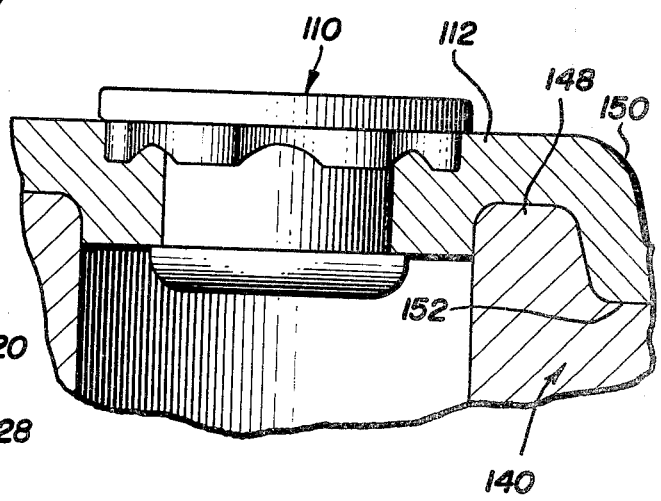

CLINCH TYPE FASTENER

REFERENCE TO RELATED APPLICATION

This application is a continuation-in-part of Application Ser. No. 467,213, filed May 6, 1974 now abandoned.

BACKGROUND OF THE INVENTION

The present invention relates to self-clinching fastener and the method of assembly thereof. More particularly, the present invention concerns an improved form of fastener which will enable and insure obtainment of a predicted, predetermined locking action with both thick and relatively thin sheet material.

Self-clinching fasteners are well-known in the art and are of numerous designs, employing various clinching or staking methods. Primarily, these prior art fasteners are of the type which are assembled in a pre-punched hole in a sheet material, and then the head portion thereof is seated and embedded in the upper surface of the sheet material to cause displacement of a portion of said material radially inwardly of the aperture causing said material to co-flow into an annular locking groove formed in the fastener. The mechanical interlock thus created provides the means for maintaining the fastener in engagement with the sheet material.

These prior art fasteners and methods of assembly are subject to certain disadvantages. First of all, as the aperture in the sheet material is prepunched, the dimensional tolerances which may be encountered will result in a wide variance in the relative sizes of the fastener and the aperture. As such, in some instances the fastener makes fit snugly in the sheet material aperture prior to clinching, while in other instances an extremely loose fit will result. It can be appreciated that upon driving or embedding of the fastener head into the sheet material only a given amount of metal will be displaced and moved radially inwardly. Therefore, where relatively loose fits are encountered, there is often insufficient metal forced into the locking groove, resulting in a mechanical connection, that is, a subject of failure in use. As will become apparent from the hereinafter description, the present invention will provide means whereby a mechanical connection of controlled, predicted strength is obtained, regardless of the thickness of the sheet material.

The degree or strength of the mechanical connection between the fastener and the sheet material is dependent upon the shear area achieved by the mechanical interlock. That is to say, the shear area is defined as the cross-sectional area of the material displaced into the locking groove, taken in the direction of shearing, in this regard axially. Keeping in mind the above-discussed problem of tolerances, where incomplete filling of the locking groove results, the mechanical strength of the connection is not of the desired level. Also, it can be appreciated that it is desirable to make the width of the locking groove as great as possible in order to maximize the shear area. With thin materials, and prior art fasteners and methods of assembly, it was not possible to employ relatively wide grooves and thus the shear area of the mechanical interlock attained was inherently weak.

More specifically, with the prior art fastener designs employed with relatively thin material, the mechanical engagement between the fastener and the material was often insufficient to prevent backing out of the fastener during use. This was occasioned, due to the necessity of employing a groove having a width less than the sheet material thickness and the resulting, inherent low shear area thus obtained.

With the self-clinching fastener of the present invention, the sheet material aperture is reworked and sized to a desired, predicted configuration which not only assures close overlying engagement of the aperture walls with the fastener locking groove prior to clinching, but also can be utilized to increase greatly the amount of material available for displacement into the locking groove. This enables employment of a fastener with a relatively wide locking groove, and obtaining of the desired mechanical locking strength on both relatively thick and thin material.

The primary embodiment of the present invention achieves the above by employing an extruding nose portion on the fastener shank, which nose portion has a generally tapered configuration. The extruding portion has an external dimension which is greater than that of the initial aperture formed in the sheet material. Accordingly, as the fastener is moved inwardly of the aperture, the sheet material adjacent the aperture will be engaged by the extruding portion and will be cold worked as said extruding portion passes through said aperture.

Two important results are achieved with the above-discussed structure and method of initial engagement. First, assuming use of relatively thick material, the difference in size between the initial aperture formed in the sheet material and the maximum dimension of the extruding portion will be slight, but sufficient to insure a reworking or resizing of the aperture. Once the extruding portion has passed through the aperture, the aperture will be resized with the aperture walls being in close sliding contact with the fastener shank overlying the locking groove. Thus, upon embedding of the head portion in the upper surface of the sheet material, substantially all of the material displaced inwardly will flow into the locking groove, rather than being utilized to overcome dimensional tolerances. Further, the volume of material displaced can be predicted and the size of said head and the volume of the annular locking groove adjusted to achieve the predetermined desired mechanical interlock depending of course upon the intended use and forces to which the connector will be subjected.

Considering now use with relatively thin material an additional advantage is achieved over and above that discussed in the preceding paragraph. As mentioned previously, with thin material and the prior art methods the width of the locking groove was limited. With the present invention, the initial size of the aperture and the relative cross-sectional dimension of the extruding portion are selected such that a considerable amount of sheet material will be forced inwardly as the extruding section passes through the sheet metal aperture. This action will produce a rimmed hole with a relatively long aperture wall, the length of said aperture wall being greater than the initial thickness of the sheet material. There is thus produced a resized aperture of increased effective length with a considerable amount of material disposed about the aperture wall. In addition, as was discussed in the preceding paragraph, the aperture walls will be in close, overlying engagement with the fastener shank. Accordingly, upon embedding of the head of the fastener in the upper surface of the sheet material, not only will the major portion of the displaced metal flow into the locking groove, but there is now afforded sufficient material to fill a relatively wide locking groove, a condition which could not be obtained without the resizing of the sheet metal aperture.

In addition to the above, the present invention also contemplates the employment of locking protuberances on the head which have a tapered undersurface, such that upon embedding of said protuberances in the sheet material, said tapered undersurface will assure radially inward movement of the displaced material, while precluding relative rotation.

The aforegoing, and other objects of the invention and the preferred mode of applying the principles of the present invention will be more clearly defined from the following description, taken in conjunction with the accompanying drawings.

DESCRIPTION OF THE DRAWINGS

FIG. 1 is a partial sectional view showing a preferred embodiment of the present invention as employed with relatively thick material;

FIG. 2 is a partial perspective view of the fastener of FIG. 1 illustrating the construction of the underside of the head portion;

FIG. 3 is a sectional view taken along the lines 3—3 of FIG. 1;

FIG. 4 is a partial elevational view of a modified form of the present invention;

FIGS. 5, 6 and 7 are partial sectional views illustrating, somewhat schematically, the method or steps employed in attaching the fastener of FIG. 1 to relatively thin sheet material;

FIGS. 8 and 9 illustrate still another modified form of the present invention, with FIG. 8 illustrating the conditions prior to the clinching operation and FIG. 9 showing the conditions obtained upon clinching of the fastener to the sheet metal material;

FIG. 10 is an elevational view, partially in section, illustrating employment of the present invention with a fastener of the internally threaded type;

FIGS. 11, 12 and 13 illustrate, somewhat schematically, and partially in section, the steps or method of attaching the fastener of FIG. 10;

FIG. 14 is an elevational view, partially in section, illustrating still another modified form of the invention.

DESCRIPTION OF THE ILLUSTRATED EMBODIMENT

Figure 15:
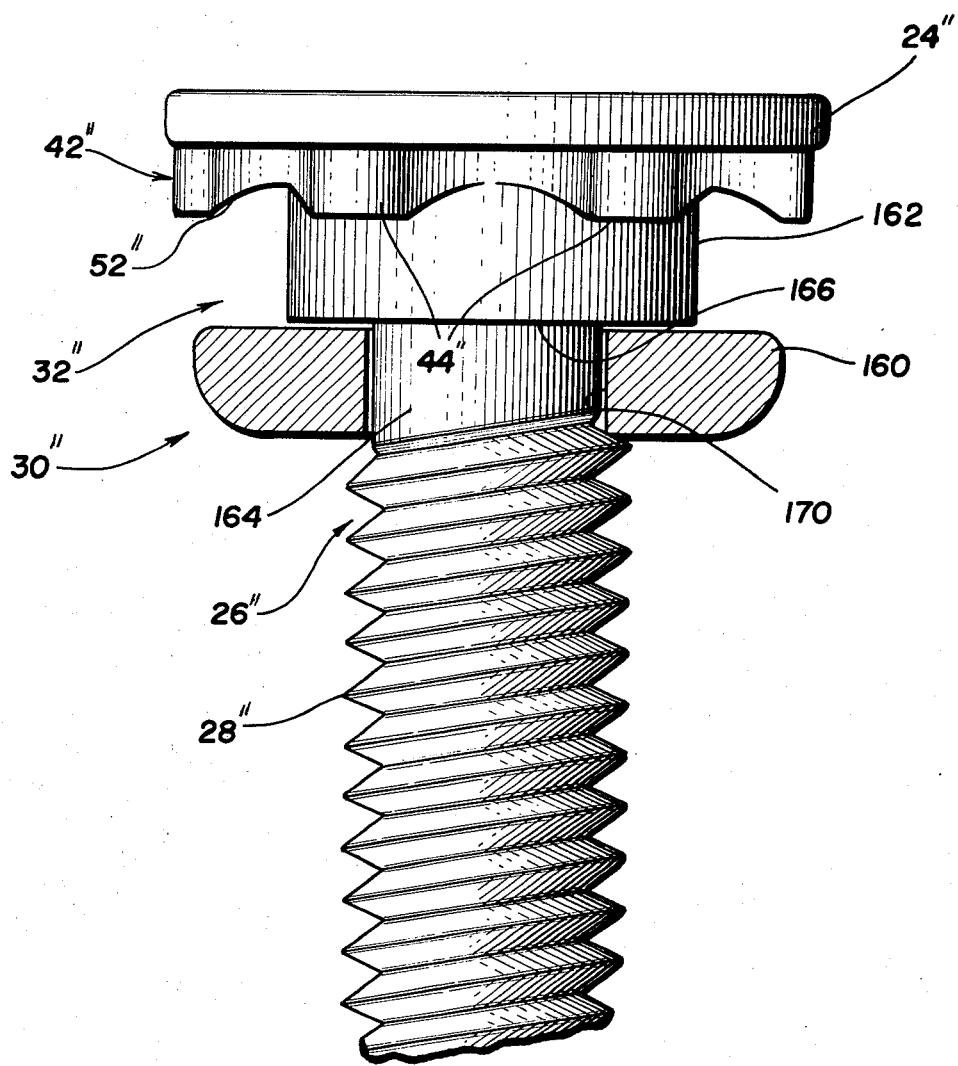
FIG. 15 is an elevational view, partially in section, illustrating a further embodiment, wherein the extruding nose portion is provided by a separate element held captive on the fastener body.

Referring now specifically to the drawings, FIG. 1 illustrates the preferred form of the invention, engaged or mechanically interlocked with a relatively thick section of sheet material. In this regard, the self-clinching fastener is designated generally 20 while the sheet material is indicated by reference character 22. The fastener 20 includes a head section 24 and an elongated shank designated generally 26. The shank 26, in the illustrated embodiment, has a threaded end portion 28 extending axially thereof for engagement with an internally threaded member (not shown). Of course, the fastener 20 may be of the double-ended type, with a threaded portion extending from the head 24, oppositely of portion 28. In addition, said shank also includes an enlarged bulbous segment or nose portion 30 disposed intermediate said head 24 and the threaded shank 28. As will be explained more completely hereinafter, the enlarged bulbous segment 30 defines the extruding section of the shank for cold working and resizing the sheet metal aperture prior to completion of the clinching operation. Formed on the intermediate portion 30 of the shank, is a locking groove 32 of relatively large width, and into which material will be forced during clinching to achieve the desired mechanical interlock.

Keeping in mind that FIG. 1 illustrates the condition existing upon completion of the clinching operation, it can be seen that the fastener 20 and more appropriately the intermediate shank portion 30 is thus engaged in an aperture 34 in the sheet material 22. The aperture 34 is termed the "final aperture" for reasons which will become apparent upon completion of the description of this embodiment. In this regard, it should be noted that a small segment of the sheet material 22 has been extruded axially of the final aperture 34 to provide a rim or lip 36 about the lower periphery thereof, while still an additional portion of segment of the sheet material which defines the final aperture 34 has been displaced radially inward into the locking groove 32.

The head 24 of the fastener is seated or embedded in the upper surface 35 of the sheet material 22, and as was explained above, it is this seating which completes the clinching operation and displaces material into the locking groove 32. An important feature of the present invention, is the construction of the head 24. In this regard, said head 24 includes an upper cap section 40 of a generally circular configuration, and a lower section 42 of an interrupted, noncircular design. It is the lower section 42 which embeds in the upper surface of the sheet material forming still another mechanical interlock, this interlock preventing relative rotation of the fastener 20 with respect to the sheet material 22.

More specifically, the lower section 42 and head 24 is defined by a plurality of radially disposed protuberances of lobes 44, best illustrated and understood from FIGS. 2 and 3. The protuberances 44 and preferably disposed about the head 24 in a generally hexagonal pattern. These protuberances, as mentioned above, are firmly embedded in the sheet material, with material flowing into the intersticies 43 therebetween (see FIG. 3) serving to produce a mechanical, torque-resisting interlock which prevents relative rotation.

While the protuberances 44 may be of various designs, it is preferred that they be formed to a generally arcuate configuration. That is to say, with reference to FIG. 3 protuberances 44 are defined by a first series of radially outwardly curved surfaces 48, having their centers located at the corners of a regular hexagon, as indicated by dotted outline. This first series of surfaces 48 merges smoothly with a second series of inwardly, oppositely curved surfaces 50. It should be noted that the particular design or configuration of the arcuately curved surfaces illustrated is disclosed in more specific detail in U.S. Pat. No. 3,584,667, which disclosure is incorporated herein by reference.

As can be seen further from FIGS. 1 and 2, each protuberance 44 extends radially outward approximately to the periphery of the cap section 40. Also, the undersurface of each protuberance 44 is defined by a tapered surface 52. Surface 52 is tapered in such a manner that the axial extent of the protuberance 44 decreases in a radially inward direction. The respective tapered surfaces 52 cooperate to provide the head 24 with a generally frusto-conical undersurface converging in a direction toward the upper portion of said head; or to express it differently, diverging in a direction toward the extruding portion 30.

During clinching, the frusto-conical undersurfaces provided by tapered surfaces 52 serve a significant function. More specifically, as the head 24 is driven into the sheet material, protuberances 44 will embed themselves in said material, with the frusto-conical undersurfaces provided by tapered surfaces 52 serving to force the cold worked or displaced material radially inward toward the locking groove 32 to insure complete filling thereof. Preferably, the side walls of the locking groove 32 will be disposed at a relatively large angle to fastener axis, to resist backing out.

While FIG. 1 illustrates the final condition when the fastener 20 is clinched to a relatively thick sheet of material, FIG. 7 shows the final condition which results upon employment of a generally similar fastener 20' with a relatively thin sheet material 22'. In this regard, FIGS. 5 and 6 illustrate progressively the method or steps of assembly of the fastener 20' to a thin sheet material section 22'. The steps of assembling the fastener 20 to a relatively thick sheet material 22 are essentially the same, the only primary difference being the degree of initial interference between the sheet material and the extruding portion 30, and the overall length of the extension of the rim 36 about the undersurface. Accordingly, a description will now be had of the method illustrated in FIGS. 5, 6 and 7, it being understood that essentially the same method will be employed with regard to assembly of the fastener 20 to achieve the conditions illustrated in FIG. 1.

Turning now to FIGS. 5-7, the fastener 20' illustrated is generally similar to the fastener 20 of FIG. 1, except that the tapered undersurfaces 52 have not been employed. Except for this change, fastener 20' is essentially the same and will function in approximately the same manner as fastener 20, previously described. Accordingly, the features of said fastener 20' are designated by the same reference characters employed with regard to fastener 20 of FIGS. 1-3, with the inclusion of a prime (') designation.

Looking first to FIG. 5, the sheet material 22' is provided with an initial aperture 56 sized to receive the threaded portion 28' of fastener 20'. In addition, apertures 56 will be selected to provide a desired degree of overlap or interference with the extruding portion 30'.

The aperture sheet material 22' is placed atop a stationary die assembly, comprised of a first, recessed die section 60, and second die member 62 carried within said recessed member 60. It should be noted in this regard, that the illustration of the die members 60 and 62 is of a generally schematic nature.

Next, after initial positioning of the fastener 20', a ram 58 or some other appropriate type of tool is engaged against the head 24' to move the fastener inwardly of the aperture 56 to the intermediate position illustrated in FIG. 6. In moving from the condition of FIG. 5 to that as illustrated in FIG. 6, the extruding portion 30' will be brought into engagement with the upper surface 35' of the sheet material 22' disposed about the aperture 56 and will extrude said material inwardly, as shown, to form an annular rim 36' engaged against a die member 60 and 62.

This intermediate deforming or extruding operation in effect serves to resize the initial aperture 56 to provide a final aperture 34' of increased length having a rim 36' disposed about the lower surface of the sheet material. As can be seen, due to the extruding operation, the wall surface of the resulting final aperture 34' is in close sliding contact with the extruding portion 30' of the fastener, and closely overlies the locking groove 32'. Accordingly, there is little or no play between sheet metal aperture 34' and the fastener 20' such that substantially all subsequently displaced material will flow inwardly into the locking groove 32'.

Looking to FIG. 7, the clinching operation has now been completed. In this regard, in progressing from the condition of FIG. 6 to that of FIG. 7, the head 24' has been seated or embedded in the upper surface 35' of the sheet material 22'. As the protuberances or lobes 44' are embedded in said upper surface, the material of the rim 36' and that disposed above said rim adjacent the walls of the aperture 34', is trapped by the extruding portion 30' interiorly; the head 24' and the die member 62 axially; and the die member 60 exteriorly. Accordingly, the material displaced by the protuberances 44' as they are embedded in the sheet material has no place to flow but radially inwardly into the locking groove 32' thus forming a tight mechanical connection. As was discussed previously, since the walls of the aperture 34' are in close proximity to the groove 32' substantially all of the displaced material is received into said groove so that the strength of the mechanical interlock thus obtained can be predicted and controlled in order to insure against backing out under the operating condition. It should also be remembered that the protuberances or lobes 44' embed themselves in the sheet material with the resulting interlock preventing relative rotation between the fastener 20' and the sheet material 22'.

Keeping in mind the above description, it can be seen that the amount of material displaced by the head 24' can be calculated and controlled by the design of the protuberances or lobes 44' and the cap portion 40', if same is to be embedded in the sheet material. Preferably, assuming the hexagonal configuration provided by the lobes or protuberances 44' and that only said lobes will be embedded in a sheet material, the volume of each lobe 44' will be between one-fifth to one-sixth of the total volume of the groove 32'. This relationship assures displacement of a sufficient amount of material to fill groove 32' completely, while accommodating for any compression of material or the extrusion of material past the die members. Of course, this mode of operation or use would also apply to the fastener 20 of FIGS. 1-3.

If desired, the protuberances 44' may be configured in accordance with the disclosure of FIG. 1, that is provided with tapered undersurfaces 52. The operation of the fastener during the clinching step will not be changed materially, the frusto-conical undersurface thus providing further control and assurance that the displaced material moves inwardly into the groove 32'.

The above-discussed method of assembling the fastener of the present invention with a section of sheet material applies equally well to the arrangement shown in FIG. 1. The only primary difference, as mentioned above, is that a lesser degree of extrusion is required wherein thick material such as sheet material 20 is encountered. With relatively thick material such as the sheet material 20 it is assured that there will be sufficient material adjacent the final aperture 34 to completely fill the locking groove 32. Thus, it is only necessary to resize the aperture slightly to assure the close overlapping contact of the aperture walls with the groove 32. Of primary significance with regard to the method of operation of FIGS. 5 and 6 previously discussed, is the fact that even though relatively thin material is employed, the mechanical interlock achieved is essentially the same as that obtained with the relatively thick material 22. In this regard, the axial width of the groove 32' is approximately that of the groove 32 of fastener 20. This result, it will be recalled, is achieved by the reshaping or resizing of the initial aperture 56 to the final form, designated 34', which aperture 34' is partially defined by an axially extending rim 36'. What in effect has been accomplished, is a repositioning of sheet material to a location about the wall of the final aperture 34' to assure that sufficient sheet material is available to fill the groove 32' upon embedding of the protuberances 44' into the upper surface of the sheet 22'. This result is achieved while also providing for the controlled, predicted interlocking engagement discussed above.

While the preferred form of the present invention employs the intermediate, extruding portion 30 or 30', it should be realized that the configuration of the head 24, as shown in FIGS. 1-3, has great utility, when employed with more conventional clinch type fasteners. In this regard, there are two aspects of a design of the head 24 that are significant; namely, the mechanical interlock attained to prevent relative rotation, and the use of the frusto-conical undersurface to assist in forcing material inwardly into the locking groove.

Considering first the mechanical interlock provided by the protuberances or lobes 44, attention is invited to FIG. 3 which is a sectional view illustrating how the sheet material is interposed in the spaces or intersticies 43 between the lobes 44. In this regard, datum circle 63 and 64 have been provided at the apexes of the lobes 44 and the inwardly curved surfaces 50, respectively. The datum circle 63 and 64, in effect, circumscribe areas of the sheet material and the lobes, respectfully, which are designated A and B. These areas A and B are in opposed relation and it is the interengagement provided thereby which resists rotative movement of the fastener 20 relative to the sheet material 22. As mentioned previously, the general design of the lobes 44 is in accordance with the teaching of U.S. Pat. No. 3,584,667, wherein lobes of this type are employed in conjunction with a drive system for fastener elements.

In the design of fastener elements it is often desirable to provide for control of any failures that may result during operation; in this regard, with the fastener 20 it is desired that failure occur in the screw threaded portion 28 rather than in the area of lobes or protuberances 44. To attain this end, the lobes 44 are designed such that the sum of the areas A, as well as the sum of the areas B, are both greater than the cross-sectional area through the threaded section 28. Accordingly, if the fastener 20 is to fail, it will fail in shear across said threaded portion 28 rather than in the area of the lobes 44 interlock with the sheet material 22.

Concerning employment of the frusto-conical undersurface, attention is now directed to FIG. 4 wherein a modified form of the present invention is shown. The fastener illustrated in FIG. 4 is designated generally 70 and includes a head 72 and a threaded shank 74. The threaded portion on shank 74 stops short of the head 72 wherein there is provided a locking groove 76. To this point, the construction of the fastener 70 is essentially that of the prior art designs. The one exception wherein the fastener 70 differs from the prior art is in the configuration of the head 72 which is designed in accordance with the fastener head 24, discussed previously.

More specifically, head 72 is provided with a cap portion 80 and a plurality of radially disposed protuberances 82, each of which has a tapering lower surface 84. Respectively tapering surfaces 84 cooperate to provide the head 72 with a generally frusto-conical undersurface. Accordingly, during clinching of the fastener 70 to a section of sheet metal material, the frusto-conical undersurface provided by surface 84 will tend to force displacement material radially inward into the groove 76. This action assures attainment of the best possible mechanical interlock and is an important improvement over fasteners which merely employ flat undersurfaces for the head portion. Of course, the lobes 82 will also resist any rotative movement, as also discussed previously.

In FIGS. 8 and 9 still another modification of the present invention is illustrated, with FIG. 8 showing the initial position prior to clinching and FIG. 9 showing the final, clinched condition. The fastener of FIGS. 8 and 9 is designated generally 90 and includes a head 92 and a shank 94 having a threaded portion 96. The head 92 may be configured in a manner similar to the fastener heads 24 or 24', discussed previously, or may be of a more conventional design. The primary feature of novelty or variance from the prior art configuration in the fastener 90 is the means provided for defining the locking groove.

More specifically, looking to FIG. 8 it should be noted that the threaded portion 96 is spaced a distance from the head 92 thus providing an intermediate section 98. The intermediate section 98 is provided with an annular, axially extending flange 100, as shown.

During initial setup prior to clinching, sheet material 102 having an aperture 104 is positioned over a die assembly comprised of inner and outer die members 106 and 108, generally as shown. The aperture 104 is sized to accept the intermediate portion 98, including flange 100 which may be of a diameter equal to or greater than that of the intermediate of said intermediate portion.

With the fastener position, as illustrated in FIG. 8, the head 92 is next engaged by the ram or some other suitable tool 107 for movement downwardly, and axially of the aperture 104 toward the final condition as shown in FIG. 9. The initial movement thus obtained, will bring the flange 100 into contact with the inner die member 108 causing said flange 100 to be deformed radially outward as shown in FIG. 9.

The deflection of the flange 100 to a radial outward position will occur prior to final clinching, such that said deflective flange 100 cooperates with the head 92 to in effect define an annular locking groove. With flange 100 extending radially it is now in a position to accept displaced material as well as to engage the undersurface of the sheet material 102.

As downward movement of the fastener 90 relative to the sheet material 102 continues in progressing from the condition of FIG. 8 to that of FIG. 9, the head 92 will embed in the upper surface of said sheet material 102 displacing a portion of said material inwardly. This material will initially flow downwardly into engagement with the flange 100 and will fill the groove thus defined by said flange 100 and the head 92. The end result is that as illustrated in FIG. 9, wherein the displaced material completely fills the groove 92 with engagement of the flange 100 with said displaced material preventing backing out of the fastener relative to said sheet material.

FIGS. 10–14 illustrate still another modified form of the invention, which is similar to that as discussed with regard to FIGS. 1–3 and 5–7. In this instance, the fastener is of an internally threaded type designed to accommodate external threaded elements (not shown), and is what may be referred to as a clinched nut. The final, clinched condition for the fastener of this embodiment is illustrated in FIG. 10, while FIGS. 11–13 illustrate the method of assembly. FIG. 14 illustrates an alternate method of assembly wherein a boss is provided in the sheet material.

The fastener of FIG. 10 is designated 110 while the sheet material to which it is connected is indicated by reference character 112; the fastener 110 being seated in a final aperture 113. In this regard, similar to fastener 20 and 20' as discussed previously, fastener 110 is adapted for use with relatively thin sheet material, as well as with thick material, while providing a relatively wide locking groove and the improved mechanical connection occasioned thereby. In addition, as will be more apparent from the following definition, the fastener provides for sizing of the aperture, regardless of whether relatively thick or thin material is encountered.

The fastener 110 includes a head 114 of the type as discussed previously with regard to FIGS. 1–3. That is to say, said head includes an upper cap portion 116 and a lower portion defined by a plurality of radially disposed lobes or protuberances 118, each having a tapering undersurface 120 providing the undersurface of the head 114 with a generally frusto-conical configuration. The shank 122 of the fastener 110 is considerably shorter than that of the previously discussed embodiments 20 and 20'. In this regard, the shank 122 includes a tapering nose portion 124 that provides for the extruding operation. Disposed on the shank 122 intermediate the extruding portion 124 and the head 114 is a relatively wide locking groove 126.

As mentioned previously, the shank 122 is provided with an internally threaded portion, shown in phantom and designated 128 for reference purposes. This internally threaded portion may extend entirely through the fastener 110, or only partially into said fastener, depending of course upon the ultimate use thereof and method of assembly.

Looking now to FIGS. 11–13, a preferred method of assembly of the fastener 110 will now be discussed. As can be seen in FIG. 11, the sheet material 112 is provided with an initial aperture 130 which is smaller than the final aperture 113 into which the fastener 110 is seated. Due to the omission of an elongate externally threaded shank, means must be provided for properly positioning the fastener during the assembly operation. In this regard, a ram 132 is provided having an elongate pin portion 134 which is receivable within the internally threaded bore 128. This pin portion 134 is of lesser diameter than the upper portion 136 of the ram, there being provided a shoulder 138 thereon.

Accordingly, the ram is brought into position with the pin portion 134 disposed interiorly of the internally threaded bore 128 of fastener 110. Due to the length of said pin portion 134, it will extend from the fastener 110 into the initial bore 130 in the sheet material 112 to position said fastener properly relative to said initial bore 130.

Once initial positioning is achieved, the shoulder 136 will be brought into engagement with the upper surface of the head 114 and the fastener is moved axially of the sheet material, which at this point rests upon a die assembly 140-142 similar to that discussed previously. In progressing from the condition illustrated in FIG. 11 to that illustrated in FIG. 12, the extruding portion 124 of the shank will deform the sheet material inwardly to provide a rimmed, resized aperture 146 which closely overlies the locking groove 126.

Upon movement of the ram downwardly from position illustrated in FIG. 12 to that illustrated in FIG. 13, the head 114 of the fastener will be embedded into the sheet material 112, with the protuberances 118 displacing material inwardly into the locking groove 126. As was discussed previously, the die members 140 and 142 serve to confine flow of the displaced material and directs that material inwardly into the groove. In addition, the lobes or protuberances 118 may be provided with tapered undersurfaces 120 which will assist in forcing the displaced material into the locking groove.

After the fastener has been properly seated, the ram with its integral pin portion 134 is withdrawn. The final result will be the clinched arrangement as illustrated in FIG. 10, with the displaced material substantially filling the locking groove 126.

With reference now to FIG. 14, in using a clinch type nut it is often desirable to have the nut recessed from the undersurface of the sheet material. To provide for this, the die member 140 may be provided with an upstanding annular flange 148 while the ram (not shown) is correspondingly provided with an enlarged flange-like extension having a properly shaped surface for deforming the sheet material 112 into the configuration shown to produce the boss 150. As can be seen, by employing this arrangement the fastener will be recessed or approximately flush with the lower surface 152 of the sheet material 112. The manner of assembly in construction of the fastener 110 illustrated in FIG. 14 is essentially that as discussed and described with regard to FIGS. 10–13 and further description thereof is deemed unnecessary.

In FIG. 15, a further embodiment of the present invention is shown, similar to that of FIGS. 1–7. The fastener 20'' differs from those of FIGS. 1–7 in that the nose on extruding portion 30'' is provided by a separate, washer-like element 160, held captive on the body of the fastener 20'' as will be explained.

The overall construction and operation of the fastener 20'' is essentially identical to that of the previously discussed embodiments. In this regard, fastener 20'' includes a head section 24'' on a shank 26'' with a threaded segment 28''. The lower section of the head 24'', designated 44'' is constructed in accordance with the embodiment of FIG. 1. More specifically, said lower portion 42'' includes protuberances 44'' having tapered under surfaces 52''. If desired the tapered under surfaces 52'' may be omitted, as per the showing of FIGS. 5–7.

The aforementioned separate element 160 has been broken away to expose to view the unthreaded portion of shank 26''. In this regard, there is a first or upper segment 162 and a second or lower segment 164, of lesser diameter, the juncture of said segments 162 and 164 serving to define an axially facing shoulder 166.

The separate washer-like element 160 is provided with a bulbous or frusto-conical exterior surface serving as the extruding portion 30''. A central aperture 170 is formed in said element 160 to a diameter greater than that of unthreaded segment 164, but less than that of segment 162. Further, the threads of threaded portion 28'' are formed to crest diameter greater than the aperture 170. As such, the element 160 is held captive between shoulder 166 and the threaded portion 28''.

During seating of the fastener 20'' with an apertured section of sheet material, the initial forces provided upon engagement of the nose portion 30'' with the material surrounding the above-mentioned aperture (not shown) will force element 160 upwardly against the shoulder 166. As the outer diameter of the element 160 is greater than that of unthreaded segment 162, said segment 162, head 24'' and element 160 serves to define an annular locking groove 32''. Basically, assembly of or mode of using fastener 20'' is effected in the same manner as previously discussed, with metal being forced into locking groove 32'' and the protuberances 44'' serving to prevent rotation. As such, the prior discussion in this regard is incorporated herein by reference.

The operation of assembling the washer-like element 160 to the fastener 20'', is generally well known in the art, and thus has not been illustrated in detail. Briefly, an unthreaded blank is prepared, and the washer-like element 160 is assembled thereon; next the blank portion to be threaded is engaged between thread rolling dies, with the washer 160 positioned exteriorly of the dies, and a thread is formed by cold forming or upsetting of the blank. The thread thus formed will have a crest diameter greater than the original blank diameter and the aperture in the washer element 160, thereby effecting a captive retention of the washer on the fastener.

While there has been disclosed herein, a preferred embodiment and several modifications, it is by no means intended that these define the full limits of the present invention. Applicant is well aware that those skilled in the art may readily device various modifications, changes or alterations from the specific designs shown, which do not depart from the spirit and scope of the invention, as those are defined by the claims appended hereto.

The invention is claimed as follows:

1. A self-clinching fastener of the type for connection to a section of sheet material, or the like, having an aperture formed therein, said fastener including a head and a shank portion, with a groove formed in said shank, with said head being embeddable in said sheet material to displace material into said groove to form a mechanical interlock between said material and said fastener, said shank including a tapered extruding portion having a surface converging in a direction away from said head, said surface merging with a cylindrical surface which provides a smooth, cylindrical, relatively elongate, continuous periphery for said extruding portion and which also defines the maximum diameter thereof, said maximum diameter selected to be greater than the diamter of said aperture whereby upon engagement of said extruding portion with said sheet material, said aperture will be resized to approximately said maximum diameter, said groove in said shank being disposed adjacent said head, and intermediate said head and said extruding portion, with the outer radial dimension of said groove, axially remote from said head being defined by said cylindrical surface of said extruding portion whereby the inner peripheral wall of said resized aperture, subsequent to engagement by said extruding portion, but prior to the embedding of said head in said sheet material, will closely overlie said groove, said head including a plurality of radially disposed projections, said projections being sized such that the volume thereof is approximately equal to the volume of said groove, whereby the volume of the material displaced upon embedding of said head in said sheet material is equal to or greater than the volume of said groove, whereby, due to the close overlying of said inner periphery of said aperture with said groove, it is assured that the material displaced will completely fill said groove upon the embedding of said head in said sheet material.

2. A self-clinching fastener as defined in claim 1, wherein said projections are defined by a first series of arcuately curved surfaces and a second series of surfaces curved oppositely of said first series and alternating therewith while merging smoothly with said first series, said projections serving, upon being embedded in said sheeted material upon seating of said head thereby to resist relative rotation of said fastener with respect to said sheeted material.

3. A self-clinching fastener, as defined in claim 1, wherein said projections include undersurfaces of a generally frusto-conical configuration, diverging outwardly in a direction away from said head, such that upon seating of said head with said sheeted material, said frusto-conical undersurfaces will force displaced material radially inward toward said groove.

4. A self-clinching fastener, as defined in claim 1, wherein said shank includes an elongate externally threaded section, of lesser diameter than said extruding section.

5. A self-clinching fastener, as defined in claim 1, wherein said intermediate extruding section is formed unitary with said shank portion.

6. A self-clinching fastener, as defined in claim 1, wherein said intermediate extruding portion is provided by a separate washer-like element mounted about said shank.

7. A self-clinching fastener, as defined in claim 6, wherein said shank includes a shoulder against which said separate washer-like element seats to space said element from said head portion.

8. A self-clinching fastener, as defined in claim 6, wherein said washer-like element is mounted to said shank in captive relation, and there is included means for maintaining said washer in captive assembled relation with said shank.

9. In the combination of an apertured sheeted material and a threaded self-clinching fastener engaged therewith, said fastener comprising a head and a shank, said shank including a peripheral locking groove formed therein and a tapered extruding section of a diameter greater than the initial diameter of the aperture formed in said sheeted material, such that upon engagement of said fastener with said sheeted material, said extruding section will deform the material about said initial aperture outwardly and inwardly to provide a rimmed aperture, with the seating of said head deforming the material of said rimmed aperture causing said material to be displaced radially inward into said groove, thereby locking said fastener to said sheeted material, said extruding portion having a surface converging in a direction away from said head, said surface merging with a cylindrical surface which provides a smooth, cylindrical, relatively elongate, continuous periphery for said extruding portion and which also defines the maximum diameter thereof, said locking groove in said shank being disposed adjacent said head, and intermediate said head and said extruding portion, with the outer radial dimension of said groove, axially remote from said head being defined by said cylindrical surface of said extruding portion whereby the inner peripheral wall of said rimmed aperture, subsequent to engagement by said extruding portion, but prior to the embedding of said head in said sheet material, will closely overlie said locking groove, said fastener head including a plurality of radially disposed projections, said projections being sized such that the volume thereof is approximately equal to the volume of said groove, whereby the volume of the material displaced upon embedding of said head in said sheet material is equal to or greater than the volume of said groove, whereby, due to the close overlying of said inner periphery of said rimmed aperture with said groove, it is assured that the material displaced will completely fill said groove upon the embedding of said head in said sheet material.

10. The structure, as defined in claim 9, wherein said shank includes an elongated, externally threaded portion, with said extruding section being of a greater external diameter than said threaded portion and being disposed intermediate said head and said threaded portion.

11. The structure, as defined in claim 10, wherein said shank includes an internally threaded bore for receiving externally threaded mating part.

12. The structure, as defined in claim 9, wherein, said projections are defined by a first series of arcuately curved surfaces and a second series of surfaces curved oppositely of said first series and alternating therewith while merging smoothly with said first series, said projections being embedded in said sheeted material upon seating of said head thereby to resist relative rotation of said fastener with respect to said sheeted material.

13. The structure, as defined in claim 9, wherein said head includes an undersurface of a generally frustoconical configuration, diverging outwardly in a direction away from said head, such that upon seating of said head with said sheeted material, said frusto-conical undersurface will force displaced material radially inward toward said groove.

* * * * *